US 8,652,698 B2

(12) United States Patent
Ota et al.

(10) Patent No.: US 8,652,698 B2
(45) Date of Patent: Feb. 18, 2014

(54) FUEL CELL, FUEL CELL SYSTEM, AND CONTROL METHOD OF FUEL CELL SYSTEM

(75) Inventors: Hisayoshi Ota, Aichi-ken (JP); Kazuyori Yamada, Okazaki (JP); Masaru Tsunokawa, Okazaki (JP); Manabu Kato, Susono (JP); Hiroo Yoshikawa, Susono (JP)

(73) Assignees: Nippon Soken, Inc., Nisho-shi, Aichi (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 775 days.

(21) Appl. No.: 12/374,741

(22) PCT Filed: Sep. 7, 2007

(86) PCT No.: PCT/JP2007/068001
§ 371 (c)(1),
(2), (4) Date: Jan. 22, 2009

(87) PCT Pub. No.: WO2008/032838
PCT Pub. Date: Mar. 20, 2008

(65) Prior Publication Data
US 2010/0003549 A1    Jan. 7, 2010

(30) Foreign Application Priority Data
Sep. 11, 2006    (JP) .................... 2006-245548

(51) Int. Cl.
*H01M 8/04*    (2006.01)
*H01M 8/10*    (2006.01)

(52) U.S. Cl.
USPC ........... 429/444; 429/431; 429/432; 429/483; 429/514

(58) Field of Classification Search
USPC .......................... 429/430–433, 443–448, 514
See application file for complete search history.

(56) References Cited

U.S. PATENT DOCUMENTS

| | | | | |
|---|---|---|---|---|
| 4,406,770 | A * | 9/1983 | Chan et al. ................. | 204/406 |
| 6,455,181 | B1 | 9/2002 | Hallum | |
| 6,635,378 | B1 * | 10/2003 | Yang et al. .................. | 429/513 |
| 7,112,385 | B2 * | 9/2006 | Rock ............................ | 429/446 |
| 2003/0022031 | A1 | 1/2003 | Manery | |
| 2004/0234835 | A1 | 11/2004 | Strobel et al. | |

FOREIGN PATENT DOCUMENTS

| | | |
|---|---|---|
| DE | 102 36 845 A1 | 2/2004 |
| EP | 0 911 898 A1 | 4/1999 |
| EP | 1 111 703 A3 | 6/2001 |
| JP | 9-312167 | 12/1997 |
| JP | 2004-327360 | 11/2004 |
| JP | 2005-116205 | 4/2005 |
| JP | 2005-166498 | 6/2005 |
| JP | 2005-243477 | 9/2005 |

* cited by examiner

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

A fuel cell has multiple cells, the multiple cells including a first cell having a first fuel gas flow path, and a second cell having a second fuel gas flow path and a sensor that measures a specific parameter value relating to a decrease in concentration of fuel gas in the second fuel gas flow path.

3 Claims, 12 Drawing Sheets

A-A Cross Section

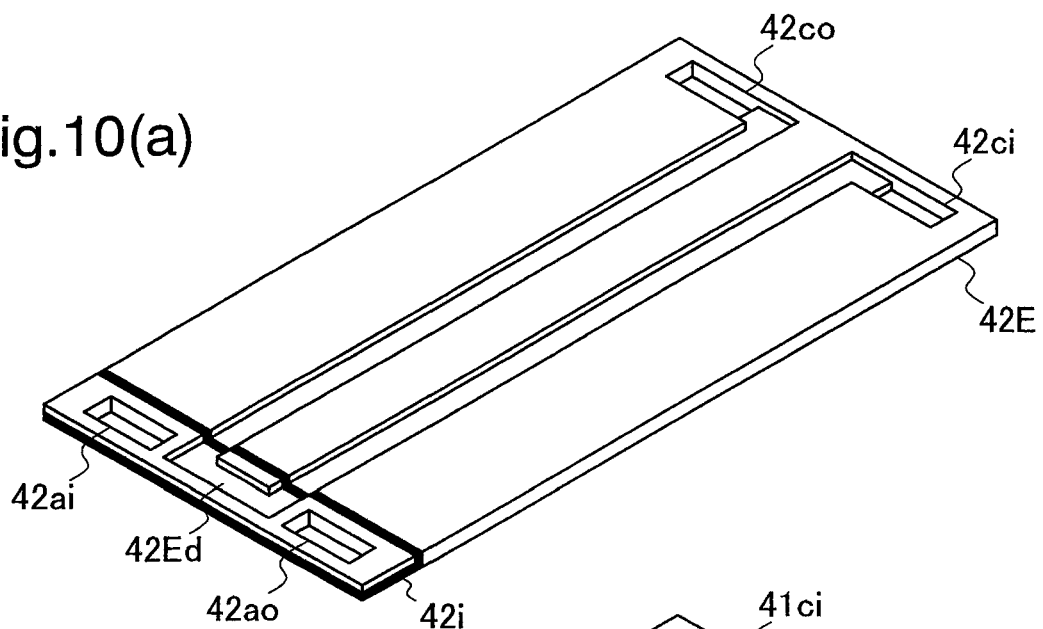
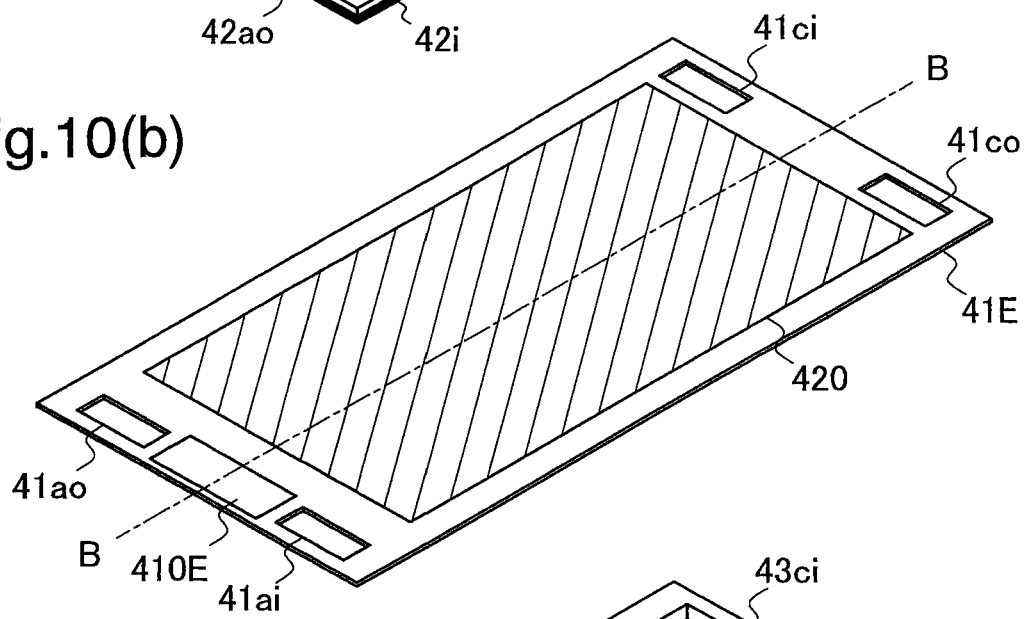
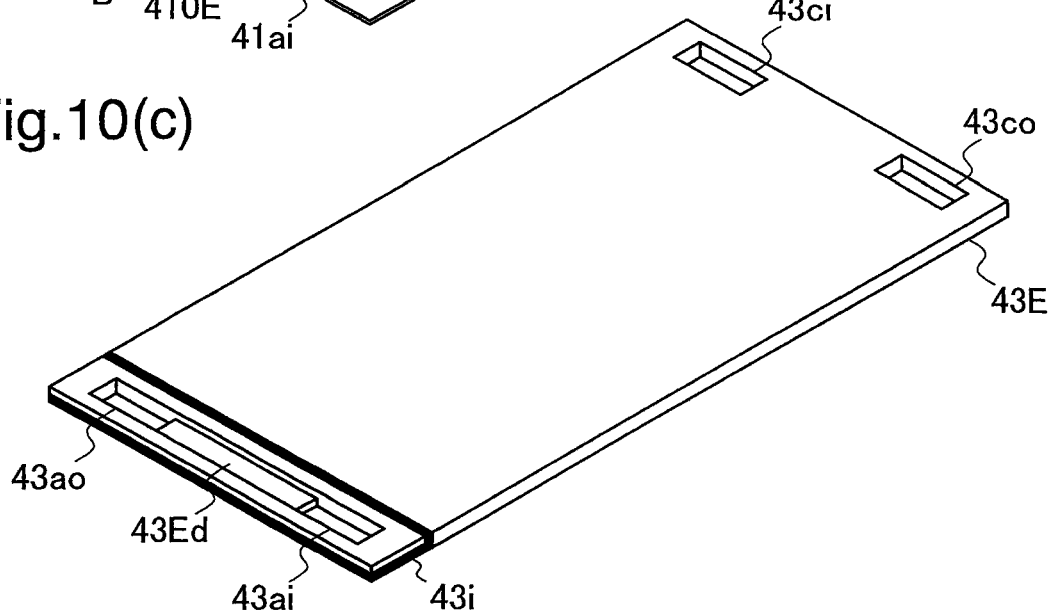

FUEL CELL, FUEL CELL SYSTEM, AND CONTROL METHOD OF FUEL CELL SYSTEM

CROSS-REFERENCE TO RELATED APPLICATIONS

This application is a national phase application of International Application No. PCT/JP2007/068001, filed Sep. 7, 2007, and claims the priority of Japanese Application No. 2006-245548, filed Sep. 11, 2006, the contents of both of which are incorporated herein by reference.

TECHNICAL FIELD

The present invention relates to a fuel cell, a fuel cell system including the fuel cell, and a control method of the fuel cell system.

BACKGROUND ART

Fuel cells generating electricity by an electrochemical reaction of hydrogen (fuel gas) with oxygen (oxidizing gas) have been noted as the effective energy source. One typical example of the fuel cell has a stack structure of multiple cells, where each cell has a membrane electrode assembly that is obtained by attaching an anode (hydrogen electrode) and a cathode (oxygen electrode) to respective surfaces of a proton-conductive electrolyte membrane and is interposed between a pair of separators. Hereafter the fuel cell having this stack structure is also called the fuel cell stack.

The fuel cell stack generally has supply manifolds (a fuel gas supply manifold and an oxidizing gas supply manifold) for distributing the supplies of reactive gases (a fuel gas and an oxidizing gas) to the anodes and the cathodes of the respective cells and exhaust manifolds (an anode off gas exhaust manifold and a cathode off gas exhaust manifold) for collecting the flows of an anode off gas and a cathode off gas from the anodes and from the cathodes of the respective cells and discharging the collected flows of the anode off gas and the cathode off gas out of the fuel cell stack.

One proposed structure of the fuel cell stack recirculates the anode off gas containing unconsumed fuel gas by power generation to the anodes of the respective cells for the effective use of the fuel gas. Another proposed structure of the fuel cell stack utilizes the fuel gas supplied to the anodes of the respective cells for power generation without discharge of the anode off gas out of the fuel cell stack or recirculation of the anode off gas to the anodes of the respective cells. The latter structure is called the anode dead end-type fuel cell.

In the fuel cells of any structures, an impurity gas that is included in the fuel gas and has no contribution to power generation is accumulated on the anodes of the respective cells. When the air is used as the oxidizing gas, an impurity gas, such as nitrogen, which is included in the air supplied to the cathodes and has no contribution to power generation, is transmitted through the electrolyte membranes and is accumulated on the anodes of the respective cells. Accumulation of the impurity gas on the anodes lowers the relative concentration of the fuel gas, thus decreasing the power generation performance of the fuel cell and deteriorating the membrane electrode assemblies. Deterioration of the membrane electrode assemblies is mainly ascribed to oxidation of carbon included in the cathodes. This problem is especially noticeable in the anode dead end-type fuel cells, where the fuel gas is accumulated on the anodes during power generation. Several techniques have been proposed to intermittently discharge the impurity gas-containing anode off gas accumulated on the anodes out of the fuel cell (see, for example, Japanese Patent Laid-Open Gazette No. 2005-166498, No. 2004-327360, and No. 2005-243477).

The control technique disclosed in Japanese Patent Laid-Open Gazette No. 2005-166498 measures a local current in a specific site in each cell having a high potential for deficiency of hydrogen (for example, in the vicinity of a hydrogen outlet in each cell) in the fuel cell and discharges the impurity gas-containing anode off gas out of the fuel cell in response to the local current of lower than a preset reference current value, in order to increase the hydrogen concentration in the cell. In a fuel cell stack of several hundred cells having an identical internal structure, it is not impossible but is highly impractical to measure the local current in all the cells for detection of the hydrogen deficiency in the respective cells. One available method measures the local current in only part of the cells among the several hundred cells for detection of the hydrogen deficiency. There is, however, a certain possibility that other cells as non-target of local current measurement have hydrogen deficiency, even when no hydrogen deficiency is detected in the part of the cells selected as the target of local current measurement.

The control technique disclosed in Japanese Patent Laid-Open Gazette No. 2004-327360 discharges the impurity gas-containing anode off gas of the respective cells out of the fuel cell, in response to a decrease in concentration of the fuel gas flowing in the whole fuel cell to or below a preset reference level or in response to an increase in concentration of the impurity gas to or above a predetermined reference level. The technique disclosed in Japanese Patent Laid-Open Gazette No. 2005-243477 collectively stores the anode off gas from the respective cells in an external buffer provided outside the fuel cell and discharges the stored anode off gas from the external buffer in response to a decrease in concentration of the fuel gas included in the anode off gas stored in the buffer to or below a preset reference level. There is inevitably a manufacturing variation in pressure loss among fuel gas flow paths of the respective cells. There is also a variation in decrease of the fuel gas concentration in the respective cells. These proposed techniques can detect only the overall decrease of the fuel gas concentration or the overall increase of the impurity gas concentration in the whole fuel cell stack, despite such variations. A relatively high discharge frequency of the fuel gas-containing anode off gas out of the fuel cell is required to avoid the potential problem in the individual cells. Namely the fuel gas usable for power generation is wastefully discharged out of the fuel cell. There is accordingly still room for improvement in the effective use of the fuel gas in the fuel cells stack.

DISCLOSURE OF THE INVENTION

There is a demand of enabling effective use of a fuel gas and preventing deterioration of membrane electrode assemblies by carbon oxidation in an anode dead end-type fuel cell.

At least part of the above and the other related demands is attained by a fuel cell, a fuel cell system including the fuel cell, and a control method of the fuel cell system having the configurations discussed below.

According to one aspect, the present invention is directed to a fuel cell having a stack structure of multiple cells, where each of the cells has a membrane electrode assembly that is obtained by integrating an anode with a cathode across a specific electrolyte membrane and is interposed between a pair of separators. The fuel cell includes: a fuel gas supply manifold that distributes a supply of fuel gas to the anodes of the respective cells; and an anode off gas exhaust manifold that collects flows of unconsumed anode off gas from the anodes of the respective cells to a collective flow of the anode off gas and discharges the collective flow of the anode off gas out of the fuel cell. Each of the cells has a fuel gas flow path that makes a flow of the fuel gas, which is supplied from the fuel gas supply manifold, along surface of the anode and makes the flow of the anode off gas into the anode off gas exhaust manifold. The multiple cells include: a first cell having a first fuel gas flow path; and a second cell having a second fuel gas flow path, which is constructed to have a specific flow path structure having a higher potential for a decrease in concentration of the fuel gas in at least a partial area during power generation, compared with a potential of the first fuel gas flow path. The second cell is provided with a sensor that measures a specific parameter value relating to the decrease in concentration of the fuel gas in the second fuel gas flow path.

The structure of the invention is adopted in the anode dead end-type fuel cell mentioned above. In the fuel cell according to this aspect of the invention, the second fuel gas flow path of the second cell has the specific flow path structure having a higher potential for a decrease in relative concentration of the fuel gas and for an increase in concentration of an impurity gas in the at least partial area during power generation, compared with the first fuel gas flow path of the first cell. In the fuel cell including a number of first cells, there may be a manufacturing variation in pressure loss among first fuel gas flow paths of the respective first cells. Even in such cases, the arrangement of the invention causes the concentrations of the fuel gas in all the first fuel gas flow paths to be higher than the concentration of the fuel gas in the second fuel gas flow path.

The sensor is used to measure the specific parameter value relating to the decrease in concentration of the fuel gas in the second fuel gas flow path of the second cell, which has the highest potential for the decrease in concentration of the fuel gas among the multiple cells. The specific parameter value measured by the sensor allows estimation of a decrease in concentration of the fuel gas to or below a preset reference concentration and an increase in concentration of the impurity gas to or over a predetermined reference level in the second fuel gas flow path of the second cell. Such estimation leads to an assumption of a decreasing concentration of the fuel gas to or below the preset reference concentration and an increasing concentration of the impurity gas to or above the predetermined reference level in the first fuel gas flow path of the first cell. The reference concentration of the fuel gas and the reference level of the impurity gas are set arbitrarily in a range of causing substantially no deterioration of the membrane electrode assembly by carbon oxidation. In response to the estimation of the fuel gas concentration decreased to or below the preset reference concentration, the anode off gas accumulated in the respective cells including the first cell and the second cell is discharged out of the fuel cell through the anode off gas exhaust manifold. The discharge of the impurity gas accumulated in the first fuel gas flow path and in the second fuel gas flow path out of the fuel cell recovers the concentration of the fuel gas to a normal level and thereby prevents deterioration of the membrane electrode assemblies of the respective cells by carbon oxidation. Adequately setting the reference concentration of the fuel gas as the criterion for determining the discharge timing of the anode off gas reduces the discharge of the unconsumed fuel gas remaining in the anode off gas out of the fuel cell and ensures the effective use of the fuel gas for power generation.

The arrangement of the invention thus enables the effective use of the fuel gas and desirably prevents deterioration of the membrane electrode assemblies in the fuel cell by carbon oxidation.

In the fuel cell of the invention, the second cell may be one or plural. In the fuel cell having multiple second cells, it is preferable to determine the discharge timing of the anode off gas out of the fuel cell, based on the lowest concentration of the fuel gas in the second fuel gas flow path of one second cell among the multiple second cells.

In one preferable embodiment of the fuel cell of the invention, the specific flow path structure of the second fuel gas flow path includes: a restriction element that narrows a sectional area of flow passage in part of the second fuel gas flow path; and a non-narrowed area other than the restriction element. A specific part of the non-narrowed area in the downstream of the restriction element has a lowered pressure than a pressure in the first fuel gas flow path. The sensor is located in the specific part of the non-narrowed area in the downstream of the restriction element.

The restriction element and the non-narrowed area provided in the second fuel gas flow path increase the pressure loss in the second fuel gas flow path to be higher than the pressure loss in the first fuel gas flow path. The pressure in the specific part of the non-narrowed area in the downstream of the restriction element is thus lowered than the pressure level in the residual area during power generation. The specific part of the non-narrowed area in the downstream of the restriction element accordingly has accumulation of the impurity gas produced in the first cell and flowed through the anode off gas exhaust manifold, as well as accumulation of the impurity gas produced in the second cell. This causes a relative decrease in concentration of the fuel gas. The sensor located in the specific part of the non-narrowed area in the downstream of the restriction element effectively detects a decrease in concentration of the fuel gas and an increase in concentration of the impurity gas in the fuel cell.

In the fuel cell of the above embodiment, the sensor may be a concentration sensor that measures at least either of a concentration of the fuel gas and a concentration of a predetermined gas other than the fuel gas, as the specific parameter value.

This arrangement directly detects a decrease in concentration of the fuel gas and an increase in concentration of the impurity gas in the fuel cell. The predetermined gas other than the fuel gas is, for example, nitrogen.

In the fuel cell of the above embodiment, the sensor may be a potential sensor that measures a local potential of either the anode or the cathode in the downstream of the restriction element, as the specific parameter value.

The decrease in concentration of the fuel gas in a specific anode area in the downstream of the restriction element locally lowers the power generation performance in the specific anode area and causes a local increase in anode potential in this specific anode area and a local increase in cathode potential in a corresponding cathode area opposed to the specific anode area across the electrolyte membrane. This arrangement indirectly detects a decrease in concentration of the fuel gas and an increase in concentration of the impurity gas in the fuel cell.

In the fuel cell of the above embodiment, the sensor may be a current sensor that detects an electric current generated in a local area of the membrane electrode assembly opposed to the specific part of the non-narrowed area in the downstream of the restriction element.

The decrease in concentration of the fuel gas in a specific anode area in the downstream of the restriction element lowers the amount of power generation and decreases the flow of electric current in the local area of the membrane electrode assembly. This arrangement indirectly detects a decrease in concentration of the fuel gas and an increase in concentration of the impurity gas in the fuel cell.

In another preferable embodiment of the fuel cell of the invention, the second fuel gas flow path has a pressure loss substantially equivalent to a pressure loss of the first fuel gas flow path and a shorter flow path length than a flow path length of the first fuel gas flow path. The sensor is a voltage sensor that measures an open circuit voltage of the second cell, as the specific parameter value.

In the fuel cell of this embodiment, the second cell is provided with the voltage sensor that measures the open circuit voltage of the second cell. The electric current generated in the second cell is not flowed into the first cell or into a load connecting with the fuel cell. Namely the second cell is used only for detection of a decrease in concentration of the fuel gas or an increase in concentration of the impurity gas in the second fuel gas flow path. In the fuel cell of this embodiment, the second fuel gas flow path is designed to have the pressure loss substantially equivalent to the pressure loss of the first fuel gas flow path and the shorter flow path length than the flow path length of the first fuel gas flow path. The capacity of the second fuel gas flow path is less than the capacity of the first fuel gas flow path. There is accordingly a higher potential for a variation in concentration of the fuel gas or a variation in concentration of the impurity gas in the second fuel gas flow path, compared with the concentration of the fuel gas or the concentration of the impurity gas in the first fuel gas flow path. The fuel cell of this arrangement enables detection of a decrease in concentration of the fuel gas and an increase in concentration of the impurity gas in the second fuel gas flow path with high accuracy.

According to another aspect, the present invention is directed to a fuel cell system including: the fuel cell having any of the above arrangements; an exhaust conduit that is connected to the anode off gas exhaust manifold; a discharge valve that is located in the exhaust conduit; and a controller that controls a discharge amount of the discharge valve. The controller enables power generation by the fuel cell with a supply of the fuel gas and a supply of an oxidizing gas respectively to the anode and to the cathode of each cell in a restricted state of the discharge valve, controls the sensor to measure the specific parameter value during power generation by the fuel cell, and opens the discharge valve in response to estimation of a decrease in concentration of the fuel gas in the second fuel gas flow path to or below a preset reference level, based on the measured specific parameter value.

The fuel cell system of the invention effectively utilizes the anode dead end-type fuel cell, which enables the effective use of the fuel gas and prevents deterioration of the membrane electrode assemblies of the fuel cell by carbon oxidation.

Any of the arrangements and characteristics described above may be combined in any adequate manner. The technique of the invention is not restricted to the fuel cell or the fuel cell system described above but is also attainable by a control method of the fuel cell system. The invention is also actualized by diversity of other applications. Examples of possible application include computer programs for attaining the control method of the fuel cell system, recording media in which such computer programs are recorded, and data signals that include such computer programs and are embodied in carrier waves. Any of the additional arrangements described above may be adopted in any of these other applications.

In the applications of the invention as the computer programs and the recording media in which the computer programs are recorded, the invention may be given as a whole program to control the operations of the fuel cell system or as a partial program to exert only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BRIEF DESCRIPTION OF THE DRAWINGS

FIG. 10 shows the structure of a cathode separator, a seal gasket-integrated MEA, and an anode separator of a second cell as the constituent of the fuel cell stack in a fourth embodiment of the invention;

BEST MODES OF CARRYING OUT THE INVENTION

Some modes of carrying out the invention are described below in the following sequence as preferred embodiments with reference to the accompanied drawings:

A. Structure of Fuel Cell System
B. First Embodiment
B1. Structure of Cells
B2. Impurity Gas Discharge Control
C. Second Embodiment
C1. Structure of Cell
C2. Impurity Gas Discharge Control
D. Third Embodiment
D1. Structure of Cell and Power Collector
D2. Impurity Gas Discharge Control
E. Fourth Embodiment
E1. Structure of Cell E2. Impurity Gas Discharge Control
F. Fifth Embodiment
G. Modifications

A. Structure of Fuel Cell System

Figure 1:
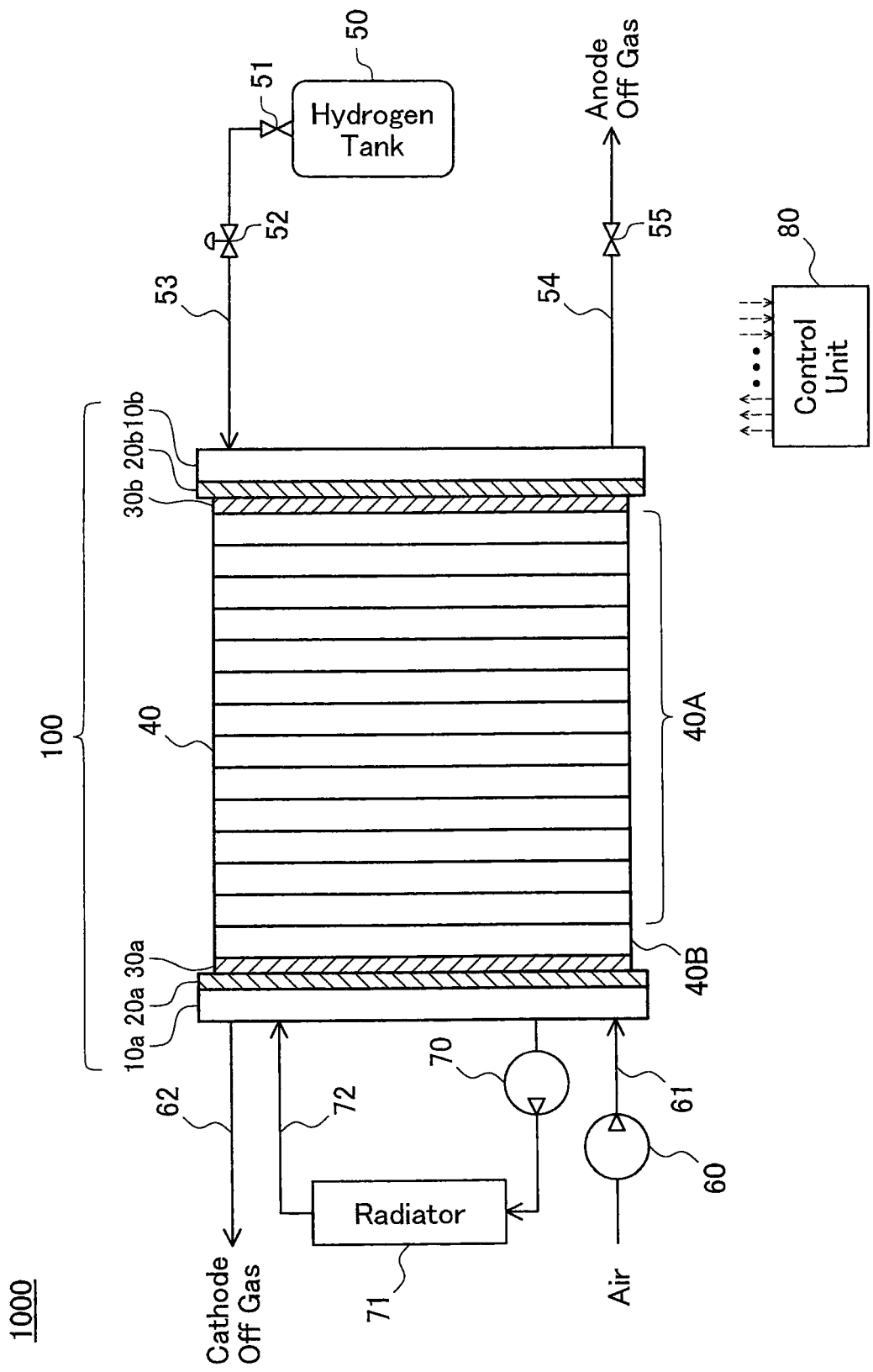
FIG. 1 schematically illustrates the structure of a fuel cell system including a fuel cell stack in one embodiment of the invention.

FIG. 1 schematically illustrates the structure of a fuel cell system 1000 including a fuel cell stack 100 in one embodiment of the invention. The respective embodiments described later have the identical basic structure of the fuel cell system 1000, except the structure of the fuel cell stack 100.

The fuel cell stack 100 is constructed as a stack structure of multiple cells 40 that generate electric power through an electrochemical reaction of hydrogen with oxygen. Each cell 40 has a membrane electrode assembly interposed between a pair of separators. The membrane electrode assembly has an anode and a cathode attached to respective surfaces of a proton-conductive electrolyte membrane. Each of the anode and the cathode includes a catalyst layer attached to the corresponding surface of the electrolyte membrane and a gas diffusion layer formed on the surface of the catalyst layer. The electrolyte membrane is a solid polymer membrane of, for example, Nafion (registered trademark) in this embodiment, although the electrolyte membrane may be made of any other suitable material, for example, a solid oxide. Each separator has a flow path of hydrogen as a fuel gas to be supplied to the anode, a flow path of the air as an oxidizing gas to be supplied to the cathode, and a flow path of cooling water. The lamination number of the cells 40 is set arbitrarily according to the power demand required for the fuel cell stack 100.

The fuel cell stack 100 is obtained by laminating an end plate 10a, an insulator plate 20a, a power collector 30a, multiple cells 40, another power collector 30b, another insulator plate 20b, and another end plate 10b in this sequence. These plates, collectors, and cells have supply inlets and discharge outlets for the flows of hydrogen, the air, and cooling water in the fuel cell stack 100. The fuel cell stack 100 includes supply manifolds (a hydrogen supply manifold, an air supply manifold, and a cooling water supply manifold) for distributing the supplies of hydrogen, the air, and cooling water to the respective cells 40 and exhaust manifolds (an anode off gas exhaust manifold, a cathode off gas exhaust manifold, and a cooling water exhaust manifold) for collecting the flows of an anode off gas and a cathode off gas from the anodes and from the cathodes of the respective cells 40 and the flows of cooling water from the respective cells 40 and discharging the collected flows of the anode off gas, the cathode off gas, and the cooling water out of the fuel cell stack 100.

In the fuel cell stack 100 of the embodiment, the multiple cells 40 include multiple first cells 40A and one second cell 40B. The second cell 40B is used for monitoring the hydrogen concentration in the course of power generation and has a different internal structure from that of the first cell 40A as described later. In the illustrated structure of FIG. 1, the second cell 40B is located adjacent to the power collector 30a. This location is, however, not essential, but the second cell 40B may be located at any other suitable position.

The end plates 10a and 10b are made of a metal, such as steel, to have the sufficient rigidity. The insulator plates 20a and 20b are made of an insulating material, such as a rubber or a resin. The power collectors 30a and 30b are made of a gas-impermeable conductive material, such as dense carbon material or copper material. The power collectors 30a and 30b have output terminals (not shown) to output the electric power generated by the fuel cell stack 100.

Although not being specifically illustrated, a pressing force is applied to the fuel cell stack 100 in its laminating direction to prevent deterioration of the cell performance due to an increase in contact resistance and to prevent a gas leakage at any position in the stack structure.

A supply of hydrogen as the fuel gas is fed from a hydrogen tank 50 for storing high-pressure hydrogen and is flowed through a supply conduit 53 to the anodes in the fuel cell stack 100. The hydrogen tank 50 is not essential but may be replaced by a mechanism of producing a hydrogen-rich gas by a reforming reaction of an alcohol, a hydrocarbon, or an aldehyde as the raw material and supplying the produced hydrogen-rich gas to the anodes in the fuel cell stack 100.

The high-pressure hydrogen stored in the hydrogen tank 50 goes through a shut valve 51 provided at the outlet of the hydrogen tank 50 and a regulator 52 for pressure regulation and flow rate regulation and is supplied via the hydrogen supply manifold to the anodes of the respective cells 40. The anode off gas from the anodes of the respective cells 40 flows through an exhaust conduit 54 connecting with the anode off gas exhaust manifold and is discharged out of the fuel cell stack 100. A discharge valve 55 provided in the exhaust conduit 54 is opened and closed to enable and prohibit the discharge of the anode off gas out of the fuel cell stack 100. Remaining hydrogen contained in the anode off gas discharged out of the fuel cell stack 100 is processed by a diluter or a combustor (not shown).

A supply of the air compressed by a compressor 60 is fed as the oxygen-containing, oxidizing gas and is flowed through a supply conduit 61 to the cathodes in the fuel cell stack 100. The compressed air is supplied to the cathodes of the respective cells 40 via the air supply manifold connecting with the supply conduit 61. The cathode off gas from the cathodes of the respective cells 40 flows through an exhaust conduit 62 connecting with the cathode off gas exhaust manifold and is discharged out of the fuel cell stack 100. Water produced by the electrochemical reaction of hydrogen with oxygen at the cathodes in the fuel cell stack 100 is discharged, together with the cathode off gas, from the exhaust conduit 62.

The fuel cell stack 100 produces heat by the electrochemical reaction and is cooled down by the flow of cooling water. The flow of cooling water is circulated through a flow conduit 72 by means of a pump 70, is cooled down by a radiator 71, and is supplied to the fuel cell stack 100.

The operations of the fuel cell system 1000 are under control of a control unit 80. The control unit 80 is constructed as a microcomputer including a CPU, a RAM, and a ROM. The control unit 80 actuates the relevant valves and pumps to control the operations of the fuel cell system 1000 according to a control program stored in the ROM. The fuel cell system 1000 of this embodiment is the anode dead end-type fuel cell system described previously and has the discharge valve 55 generally closed during power generation. With an increase in concentration of an impurity gas included in the gas flow to the anode of the fuel cell stack 100 and a resulting relative decrease in hydrogen concentration to or below a preset reference level, the control unit 80 executes a series of impurity gas discharge control to discharge the impurity gas-containing anode off gas out of the fuel cell stack 100 as described later. The control unit 80 of the embodiment is equivalent to a controller of the invention.

B. First Embodiment

B1. Structure of Cells

In a first embodiment of the invention, the first cell 40A has the structure described below. The first cell 40A of this structure is also used in fuel cell stacks of second to fourth embodiments of the invention. The explanation on the structure of the first cell 40A is thus omitted in the description of the second to the fourth embodiments.

Figure 2:
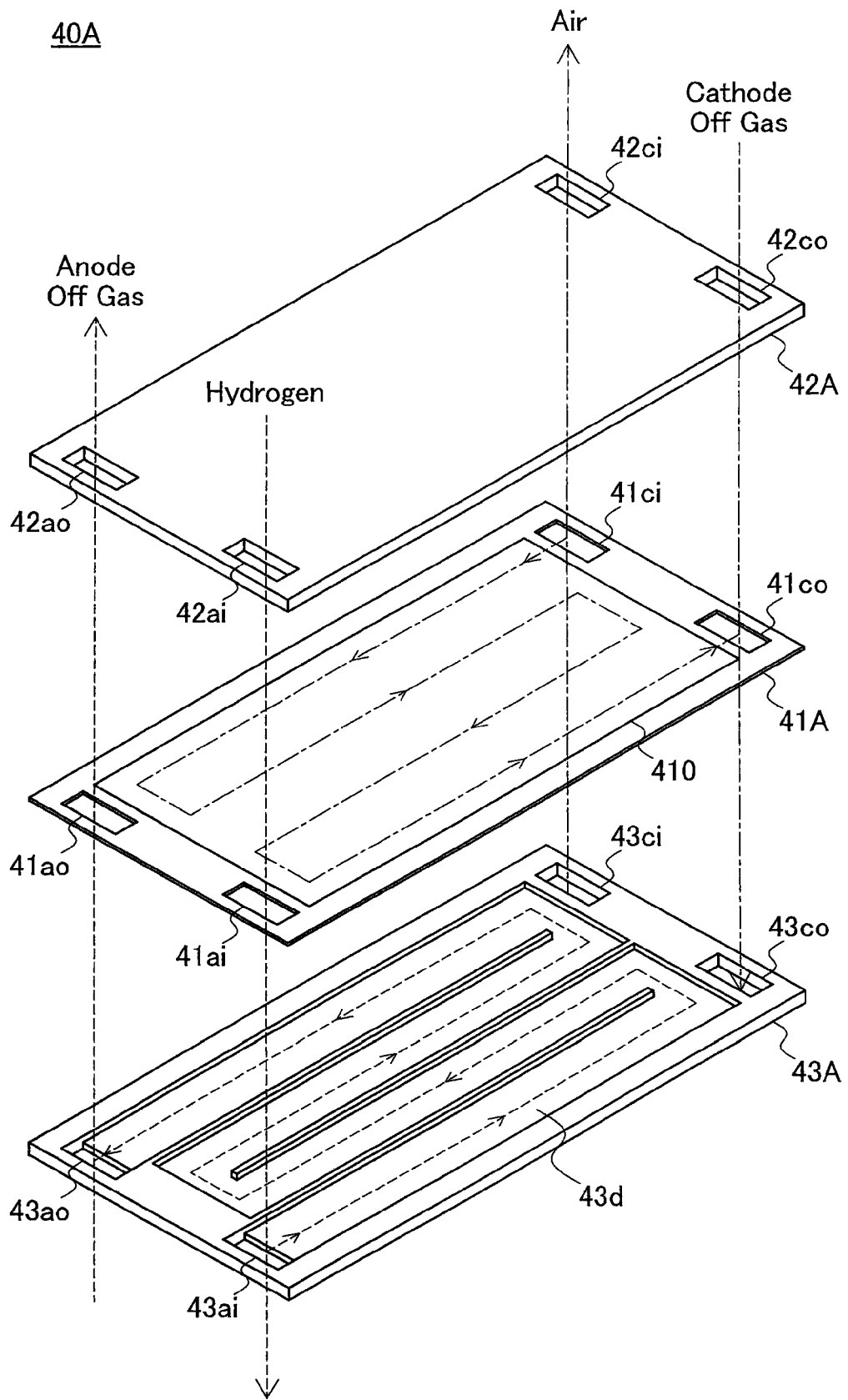
FIG. 2 schematically illustrates the structure of a first cell as a constituent of the fuel cell stack in a first embodiment of the invention.

FIG. 2 is a decomposed perspective view schematically illustrating the structure of the first cell 40A in the first embodiment. The first cell 40A has a rectangular shape and includes a seal gasket-integrated MEA (membrane electrode assembly) 41A interposed between a cathode separator 42A and an anode separator 43A. The seal gasket-integrated MEA 41A has a membrane electrode assembly 410 surrounded by a sealing frame member (not shown). The sealing frame member is made of silicone rubber in this embodiment.

As illustrated, the seal gasket-integrated MEA 41A, the cathode separator 42A, and the anode separator 43A have, along their respective one short sides, through holes 41$ai$ 42$ai$, and 43$ai$ for formation of the hydrogen supply manifold and through holes 41$ao$, 42$ao$, and 43$ao$ for formation of the anode off gas exhaust manifold. The seal gasket-integrated MEA 41A, the cathode separator 42A, and the anode separator 43A also have, along their respective other short sides, through holes 41$ci$, 42$ci$, and 43$ci$ for formation of the air supply manifold and through holes 41$co$, 42$co$, and 43$co$ for formation of the cathode off gas exhaust manifold. The through holes 41$ai$, 41$ao$, 41$ci$, and 41$co$ formed in the seal gasket-integrated MEA 41A, the through holes 42$ai$, 42$ao$, 42$ci$, and 42$co$ formed in the cathode separator 42A, and the through holes 43$ai$, 43$ao$, 43$ci$, and 43$co$ formed in the anode separator 43A are arranged to be respectively aligned in lamination of the seal gasket-integrated MEA 41A, the cathode separator 42A, and the anode separator 43A.

The anode separator 43A has a groove 43$d$ formed between the through hole 43$ai$ and the through hole 43$ao$ on its surface opposed to the anode of the membrane electrode assembly 410 to make a serpentine flow of hydrogen over the whole surface of the anode of the membrane electrode assembly 410. The arrows of the broken line represent the flow of hydrogen and the anode off gas. This representation is adopted in any of subsequent drawings illustrating the cell structures. The groove 43$d$ formed in the anode separator 43A of the first cell 40A in the structure of the embodiment is equivalent to the first fuel gas flow path of the invention.

Although not being specifically illustrated, like the anode separator 43A, the cathode separator 42A has a groove formed between the through hole 42$ci$ and the through hole 42$co$ on its surface opposed to the cathode of the membrane electrode assembly 410 to make a serpentine flow of the air over the whole surface of the cathode of the membrane electrode assembly 410. The arrows of the one-dot chain line represent the flow of the air and the cathode off gas. This representation is adopted in any of subsequent drawings illustrating the cell structures.

The seal gasket-integrated MEA 41A, the cathode separator 42A, and the anode separator 43A actually have other through holes for formation of the cooling water supply manifold and for formation of the cooling water exhaust manifold, as well as cooling water flow paths. These elements are omitted for the simplicity of illustration and explanation.

The description regards the structure of the second cell 40B.

Figure 3:
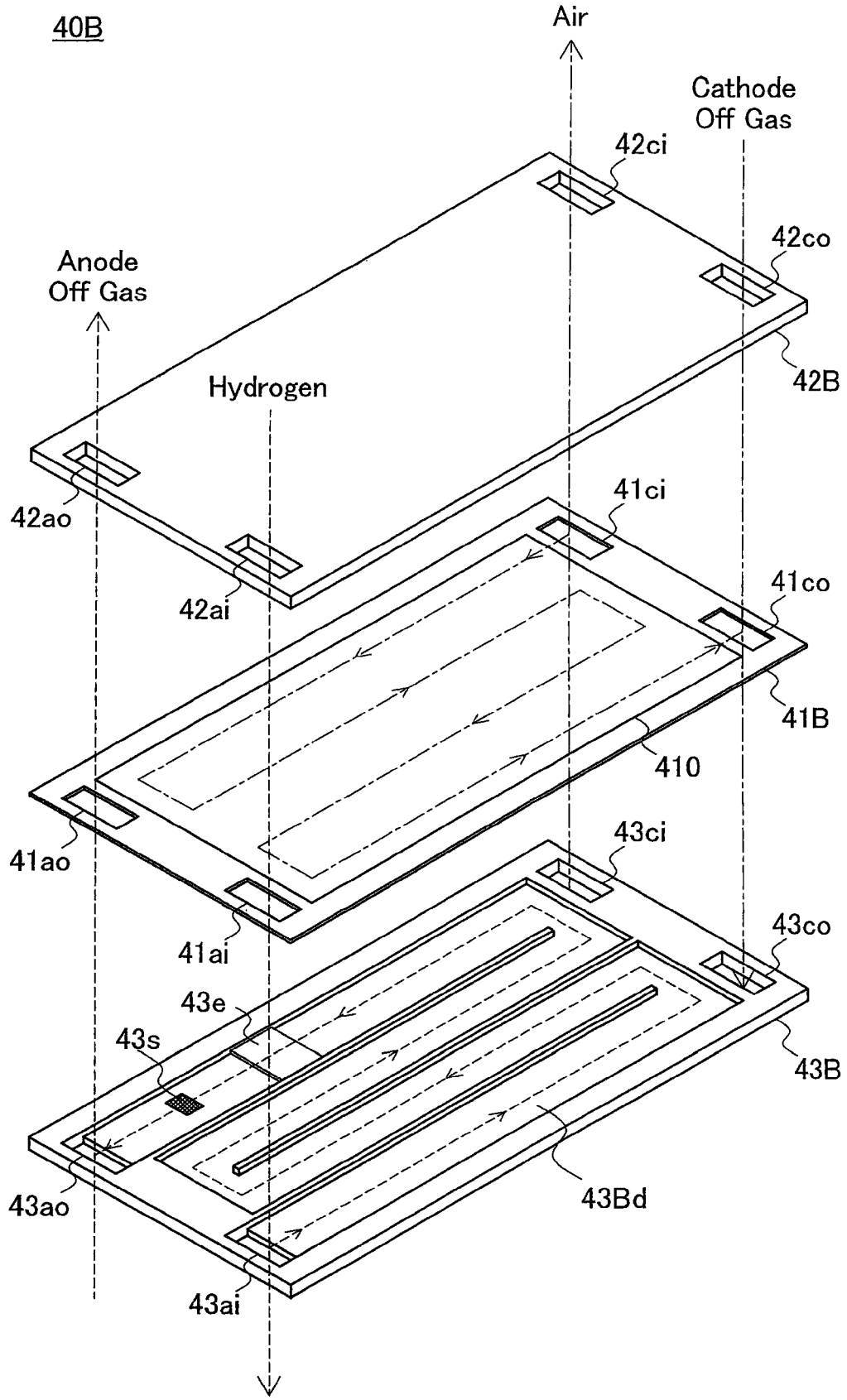
FIG. 3 schematically illustrates the structure of a second cell as another constituent of the fuel cell stack in the first embodiment.

FIG. 3 is a decomposed perspective view schematically illustrating the structure of the second cell 40B in the first embodiment. Like the first cell 40A, the second cell 40B has a rectangular shape and includes a seal gasket-integrated MEA 41B interposed between a cathode separator 42B and an anode separator 43B. The seal gasket-integrated MEA 41B has a membrane electrode assembly 410 surrounded by a sealing frame member (not shown).

The seal gasket-integrated MEA 41B, the cathode separator 42B, and the anode separator 43B of the second cell 40B have through holes of the identical shapes at the identical positions with those formed in the seal gasket-integrated MEA 41A, the cathode separator 42A, and the anode separator 43A of the first cell 40A. The seal gasket-integrated MEA 41B and the cathode separator 42B of the second cell 40B are identical with the seal gasket-integrated MEA 41A and the cathode separator 42A of the first cell 40A.

The anode separator 43B has a groove 43B$d$ formed between the through hole 43$ai$ and the through hole 43$ao$ on its surface opposed to the anode of the membrane electrode assembly 410 to make a serpentine flow of hydrogen over the whole surface of the anode of the membrane electrode assembly 410. As illustrated, the groove 43B$d$ has a restriction element 43$e$ provided in an area close to the downstream through hole 43$ao$ to narrow the sectional area of the flow passage. The restriction element 43$e$ may be formed integrally with the anode separator 43B or may be provided as a separate member to be attached to the groove 43B$d$. A hydrogen concentration sensor 43$s$ for measuring the hydrogen concentration is provided in the downstream of the restriction element 43$e$, that is, in the groove 43B$d$ between the restriction element 43$e$ and the through hole 43$ao$. The groove 43B$d$ formed in the anode separator 43B in the structure of the embodiment is equivalent to the second fuel gas flow path of the invention. The remaining area of the groove 43B$d$ other than the restriction element 43$e$ in the structure of the embodiment is equivalent to the non-narrowed area of the invention. The groove 43B$d$ between the restriction element 43$e$ and the through hole 43$ao$ is hereafter referred to as 'non-narrowed area in the downstream of the restriction element 43$e$'.

In the course of power generation with the discharge valve 55 (see FIG. 1) in the closed state, the pressure in the non-narrowed area in the downstream of the restriction element 43$e$ on the anode separator 43B of the second cell 40B becomes lower than the pressure in the other area. The non-narrowed area in the downstream of the restriction element 43$e$ accordingly has accumulation of an impurity gas produced in the second cell 40B, as well as accumulation of an impurity gas produced in the first cell 40A and flowed through the anode off gas exhaust manifold. Namely the non-narrowed area in the downstream of the restriction element 43$e$ on the anode separator 43B of the second cell 40B has a higher potential for an increase in concentration of the impurity gas and a resulting relative decrease in hydrogen concentration, compared with the grooves 43$d$ formed on the anode separators 43A of the first cells 40A. The hydrogen concentration sensor 43$s$ located in the non-narrowed area in the downstream of the restriction element 43$e$ on the anode separator 43B of the second cell 40B effectively detects a decrease in hydrogen concentration and an increase in concentration of the impurity gas in the fuel cell stack 100.

B2. Impurity Gas Discharge Control

Figure 4:
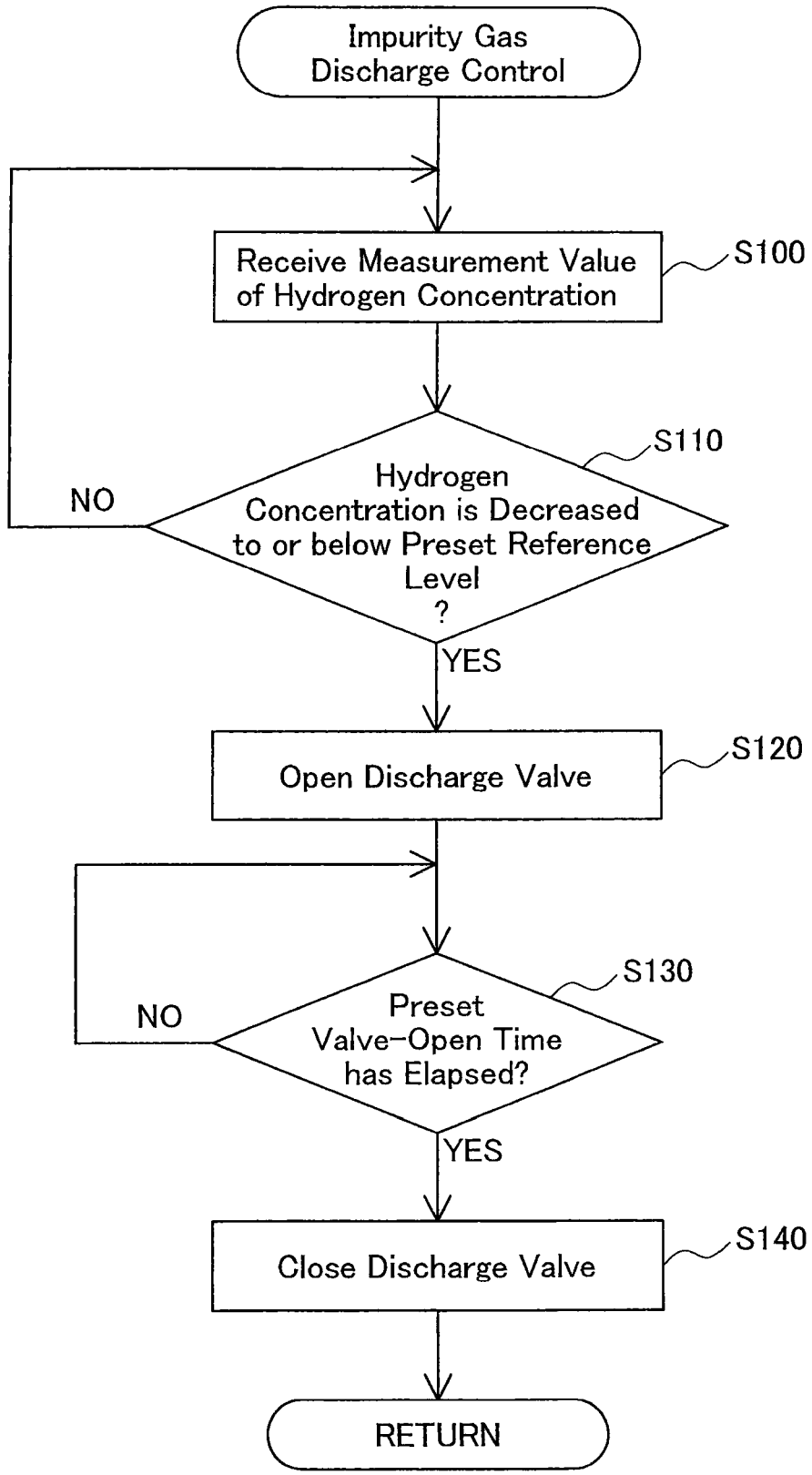
FIG. 4 is a flowchart showing a series of impurity gas discharge control executed in the first embodiment.

FIG. 4 is a flowchart showing a series of impurity gas discharge control executed in the first embodiment. The CPU of the control unit 80 occasionally executes the impurity gas discharge control in the course of power generation. The discharge valve 55 is closed on a start of the impurity gas discharge control.

The CPU receives a measurement value of the hydrogen concentration in the non-narrowed area in the downstream of the restriction element 43$e$ on the anode separator 43B of the second cell 40B from the hydrogen concentration sensor 43$s$ (step S100) and determines whether the measured hydrogen concentration is decreased to or below a preset reference level (step S110). The reference level of the hydrogen concentration is set, for example, to a lower limit of a non-carbon oxidation range where the catalyst layer of the cathode in the membrane electrode assembly 410 has no carbon oxidation by the decrease of the hydrogen concentration.

When the hydrogen concentration received at step S100 is decreased to or below the preset reference level (step S110: yes), the CPU opens the discharge valve 55 (step S120) to enable discharge of the impurity gas-containing anode off gas out of the fuel cell stack 100. When the hydrogen concentration is higher than the preset reference level (step S110: no), on the other hand, the processing of steps S100 and S110 is repeated.

The CPU then determines whether a preset valve-open time has elapsed since the opening of the discharge valve 55 (step S130). The valve-open time is set to a certain time period required for sufficiently discharging the impurity gas out of the fuel cell stack 100.

After elapse of the preset valve-open time (step S130: yes), the CPU closes the discharge valve 55 (step S140) to stop the discharge of the impurity gas-containing anode off gas out of the fuel cell stack 100.

The structure of the first embodiment enables the effective use of hydrogen as the fuel gas and prevents deterioration of the membrane electrode assemblies 410 of the fuel cell stack 100 by carbon oxidation in the anode dead end-type fuel cell system 1000.

C. Second Embodiment

C1. Structure of Cell

Figure 5:
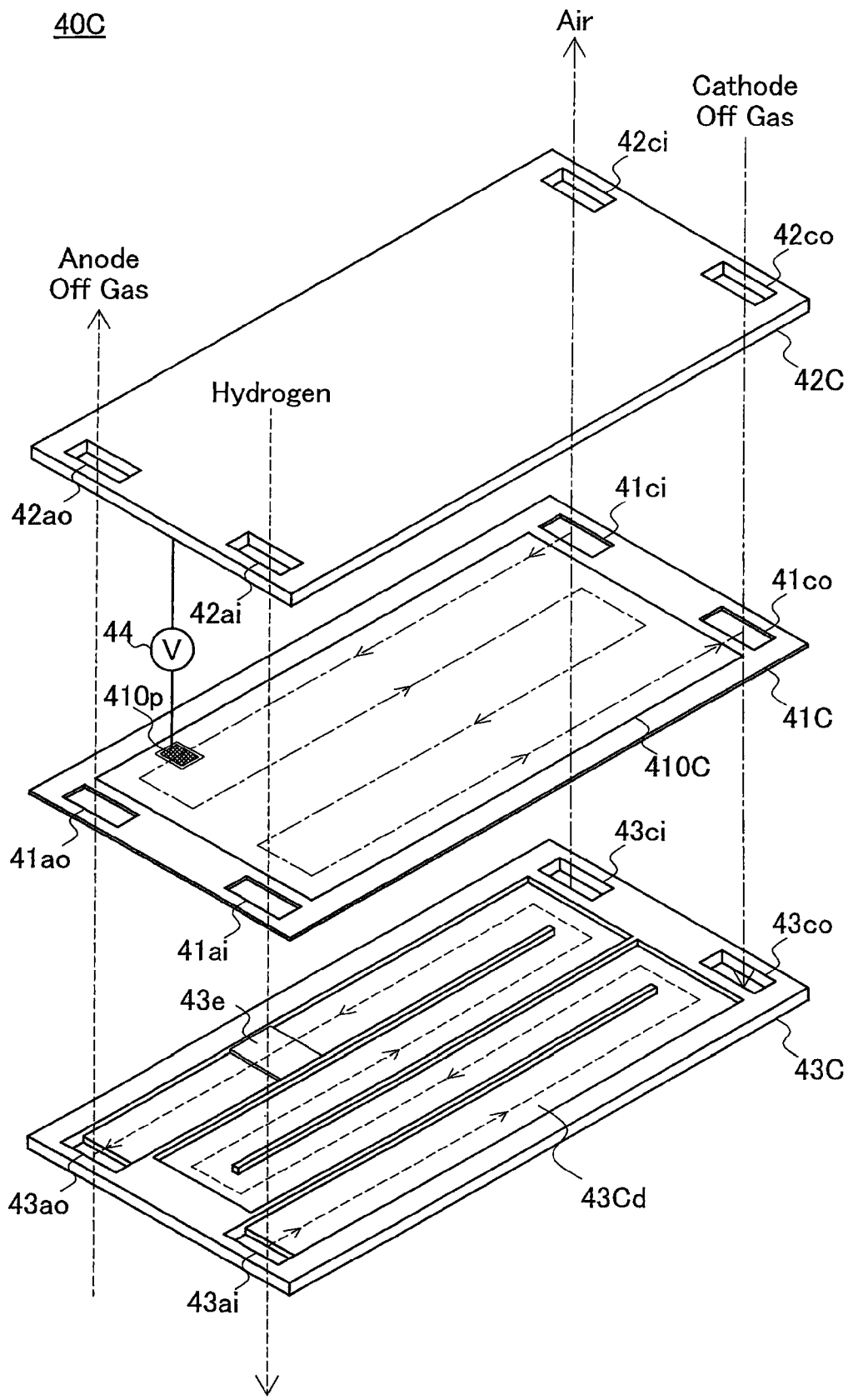
FIG. 5 schematically illustrates the structure of a second cell as the constituent of the fuel cell stack in a second embodiment of the invention.

FIG. 5 is a decomposed perspective view schematically illustrating the structure of a second cell 40C in a second embodiment of the invention. Like the first cell 40A described in the first embodiment, the second cell 40C of the second embodiment has a rectangular shape and includes a seal gasket-integrated MEA 41C interposed between a cathode separator 42C and an anode separator 43C. The seal gasket-integrated MEA 41C has a membrane electrode assembly 410C surrounded by a sealing frame member (not shown).

The seal gasket-integrated MEA 41C, the cathode separator 42C, and the anode separator 43C of the second cell 40C have through holes of the identical shapes at the identical positions with those formed in the seal gasket-integrated MEA 41A, the cathode separator 42A, and the anode separator 43A of the first cell 40A. The seal gasket-integrated MEA 41C and the cathode separator 42C of the second cell 40C are identical with the seal gasket-integrated MEA 41A and the cathode separator 42A of the first cell 40A.

Like the anode separator 43C of the first embodiment, the anode separator 43C of the second embodiment has a groove 43Cd formed between the through hole 43ai and the through hole 43ao on its surface opposed to the anode of the membrane electrode assembly 410C to make a serpentine flow of hydrogen over the whole surface of the anode of the membrane electrode assembly 410C. The groove 43Cd has a restriction element 43e provided in an area close to the downstream through hole 43ao to narrow the sectional area of the flow passage. Unlike the anode separator 43B of the first embodiment, the anode separator 43C of the second embodiment has no hydrogen concentration sensor 43s in the non-narrowed area in the downstream of the restriction element 43e, that is, in the groove 43Cd between the restriction element 43e and the through hole 43ao. In the structure of the second embodiment, a partial electrode 410p is provided in an opposed area on the cathode of the membrane electrode assembly 410C to be insulated from the other area on the cathode. The opposed area on the cathode of the membrane electrode assembly 410C is opposite to the non-narrowed area in the downstream of the restriction element 43e with the hydrogen concentration sensor 43e located in the structure of the first embodiment. The second cell 40C additionally has a potential sensor 44 to measure a partial potential of the partial electrode 410p or a local cathode potential.

In the course of power generation with the discharge valve 55 (see FIG. 1) in the closed state, the non-narrowed area in the downstream of the restriction element 43e on the anode separator 43C of the second cell 40C has a higher potential for an increase in concentration of the impurity gas and a resulting relative decrease in hydrogen concentration, compared with the grooves 43d formed on the anode separators 43A of the first cells 40A, as described in the first embodiment. The decreased hydrogen concentration in this non-narrowed downstream area leads to an increase in local cathode potential in the opposed area opposite to the non-narrowed downstream area across the electrolyte membrane. Measurement of the cathode potential of the partial electrode 410p by the potential sensor 44 indirectly detects a decrease in hydrogen concentration and an increase in concentration of the impurity gas in the fuel cell stack 100.

C2. Impurity Gas Discharge Control

Figure 6:
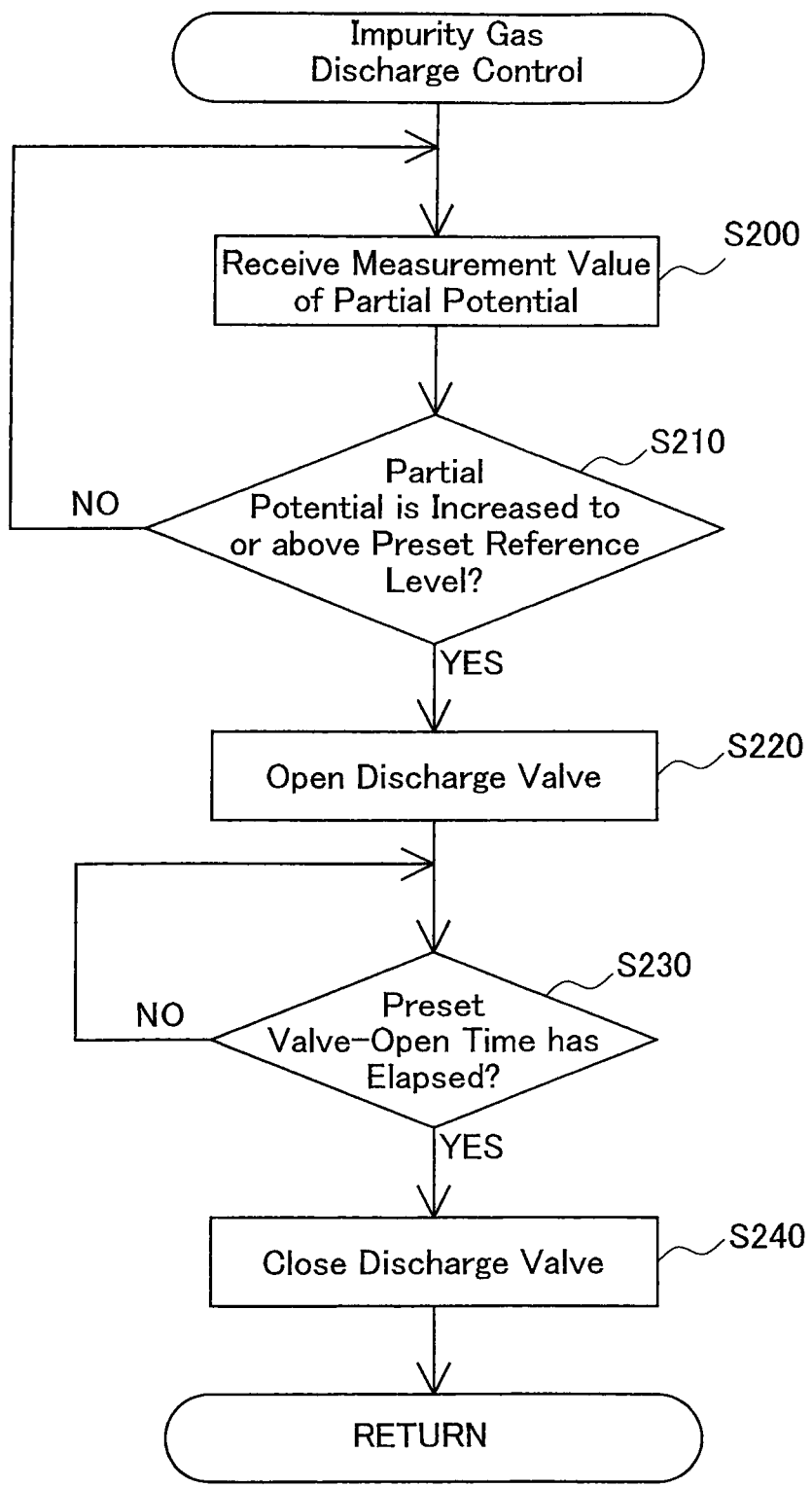
FIG. 6 is a flowchart showing a series of impurity gas discharge control executed in the second embodiment.

FIG. 6 is a flowchart showing a series of impurity gas discharge control executed in the second embodiment. The CPU of the control unit 80 occasionally executes the impurity gas discharge control in the course of power generation. The discharge valve 55 is closed on a start of the impurity gas discharge control.

The CPU receives a measurement value of the partial potential of the partial electrode 410p from the potential sensor 44 (step S200) and determines whether the measured partial potential is increased to or above a preset reference level (step S210). The reference level of the partial potential is set, for example, to an upper limit of a non-carbon oxidation range where the catalyst layer of the cathode in the membrane electrode assembly 410C has no carbon oxidation by the decrease of the hydrogen concentration.

When the partial potential of the partial electrode 410p received at step S200 is increased to or above the preset reference level (step S210: yes), the CPU estimates an increase in concentration of the impurity gas included in the anode off gas and a resulting excessive relative decrease in hydrogen concentration. The CPU accordingly opens the discharge valve 55 (step S220) to enable discharge of the impurity gas-containing anode off gas out of the fuel cell stack 100. When the partial potential of the partial electrode 410p is lower than the preset reference level (step S210: no), on the other hand, the processing of steps S200 and S210 is repeated.

The CPU then determines whether a preset valve-open time has elapsed since the opening of the discharge valve 55 (step S230). The valve-open time is set to a certain time period required for sufficiently discharging the impurity gas out of the fuel cell stack 100.

After elapse of the preset valve-open time (step S230: yes), the CPU closes the discharge valve 55 (step S240) to stop the discharge of the impurity gas-containing anode off gas out of the fuel cell stack 100.

The structure of the second embodiment also enables the effective use of hydrogen as the fuel gas and prevents deterioration of the membrane electrode assemblies 410C of the fuel cell stack 100 by carbon oxidation in the anode dead end-type fuel cell system 1000.

D. Third Embodiment

D1. Structure of Cell and Power Collector

Figure 7:
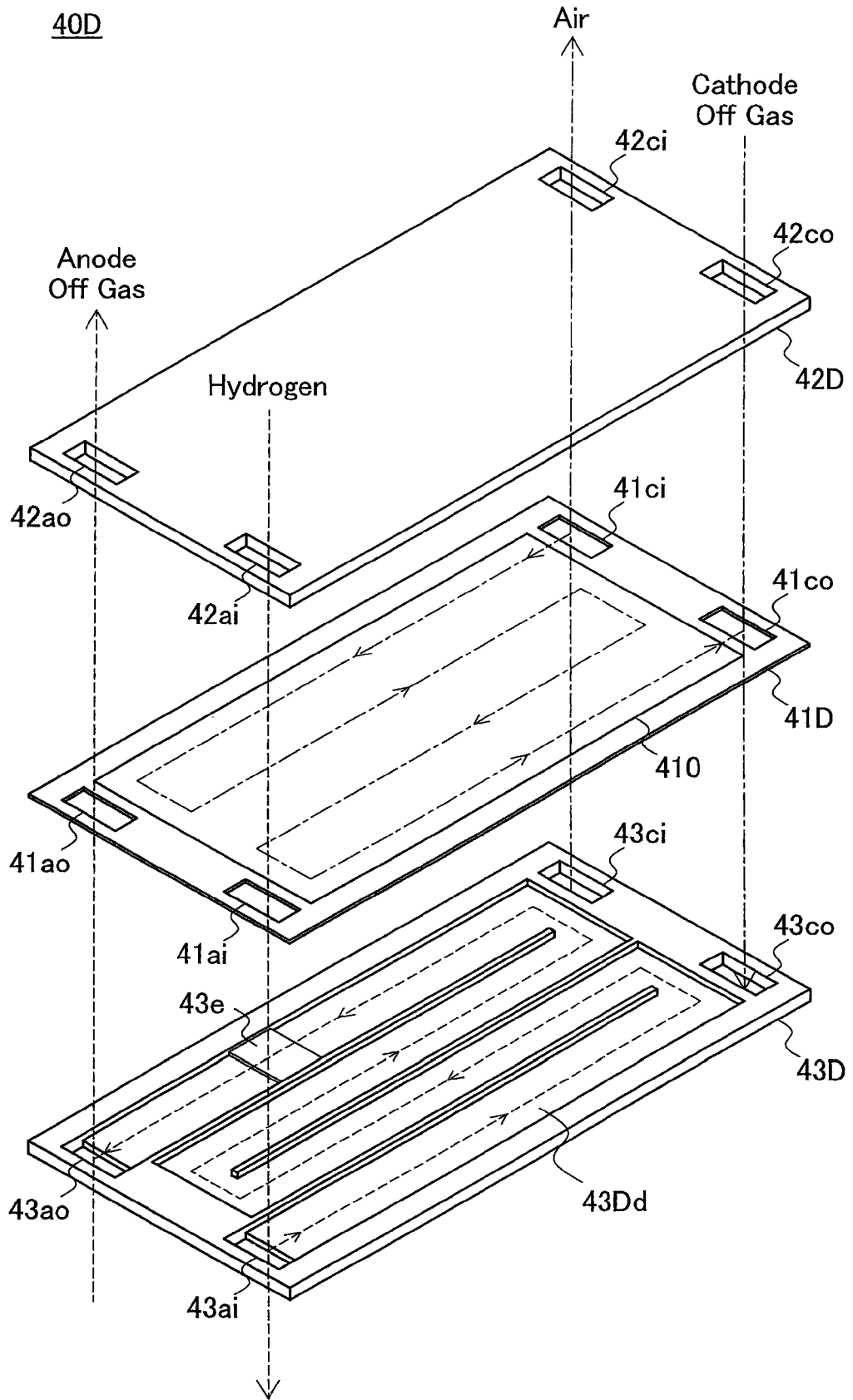
FIG. 7 schematically illustrates the structure of a second cell as the constituent of the fuel cell stack in a third embodiment of the invention.

FIG. 7 is a decomposed perspective view schematically illustrating the structure of a second cell 40D in a third embodiment of the invention. Like the first cell 40A described in the first embodiment, the second cell 40D of the third embodiment has a rectangular shape and includes a seal gasket-integrated MEA 41D interposed between a cathode separator 42D and an anode separator 43D. The seal gasket-integrated MEA 41D has a membrane electrode assembly 410 surrounded by a sealing frame member (not shown).

The seal gasket-integrated MEA 41D, the cathode separator 42D, and the anode separator 43D of the second cell 40D have through holes of the identical shapes at the identical positions with those formed in the seal gasket-integrated MEA 41A, the cathode separator 42A, and the anode separator 43A of the first cell 40A. The seal gasket-integrated MEA 41D and the cathode separator 42D of the second cell 40D are identical with the seal gasket-integrated MEA 41A and the cathode separator 42A of the first cell 40A. The anode separator 43D of the third embodiment is identical with the anode separator 43C of the second embodiment. The anode separator 43D of the third embodiment has a groove 43Dd formed between the through hole 43ai and the through hole 43ao on its surface opposed to the anode of the membrane electrode assembly 410 to make a serpentine flow of hydrogen over the whole surface of the anode of the membrane electrode assembly 410. The groove 43Dd has a restriction element 43e provided in an area close to the downstream through hole 43ao to narrow the sectional area of the flow passage.

In the structure of the third embodiment, the second cell 40D is located at an end of the fuel cell stack 100, which corresponds to the position adjacent to the power collector 30a in the structure of the first embodiment shown in FIG. 1. The fuel cell stack 100 of the third embodiment has a power collector 30Da having a different structure from that of the power collector 30a of the first embodiment.

Figure 8A:
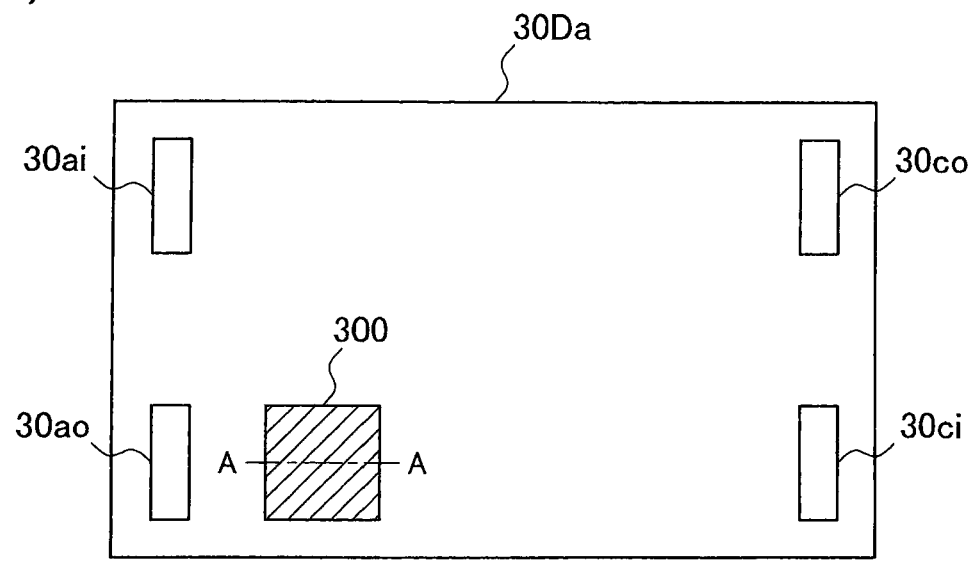
FIG. 8 shows the schematic structure of a power collector as another constituent of the fuel cell stack in the third embodiment.
Figure 8B:
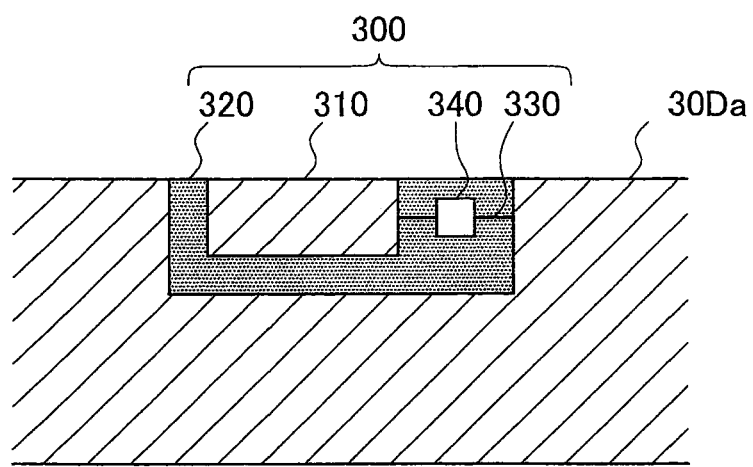

FIG. 8 shows the schematic structure of the power collector 30Da in the third embodiment. FIG. 8(a) is a plan view of the power collector 30Da seen from the second cell 40D, and FIG. 8(b) is a sectional view taken on the line A-A in FIG. 8(a). Terminals for collection of electric current are omitted from the illustration of FIG. 8(a).

As shown in FIG. 8(a), the power collector 30Da of the third embodiment is rectangular in shape and has through holes 30ai, 30ci, 30ao, and 30co at positions corresponding to the through holes for formation of the hydrogen supply manifold, those for formation of the air supply manifold, those for formation of the anode off gas exhaust manifold, and those for formation of the cathode off gas exhaust manifold in the seal gasket-integrated MEA 41D, the cathode separator 42D, and the anode separator 43D of the second cell 40D. The power collector 30Da additionally has a local current detector 300 at a specific position that is in contact with the anode separator 43D and corresponds to the non-narrowed area in the downstream of the restriction element 43e on the anode separator 43D. The local current detector 300 detects a flow of local current generated in the membrane electrode assembly 410 of the non-narrowed area.

The local current detector 300 includes a local current measurement plate 310, an insulating member 320, a connection element 330, and a current sensor 340 as shown in FIG. 8(b). The local current measurement plate 310 is insulated from the surrounding area of the power collector 30Da by means of the insulating member 320. The surface of the local current measurement plate 310 is leveled with the surface of the power collector 30Da to enable both the power collector 30Da and the local current measurement plate 310 to be in contact with the anode separator 43D. The local current measurement plate 310 is connected with the surrounding area of the power collector 30Da by means of the connection element 330. The current sensor 340 located on the connection element 330 measures the local current flowing through the local current measurement plate 310.

In the course of power generation with the discharge valve 55 (see FIG. 1) in the closed state, the non-narrowed area in the downstream of the restriction element 43e on the anode separator 43D of the second cell 40D has a higher potential for an increase in concentration of the impurity gas and a resulting relative decrease in hydrogen concentration, compared with the grooves 43d formed on the anode separators 43A of the first cells 40A, as described in the first embodiment. The decreased hydrogen concentration in this non-narrowed downstream area causes a local decrease in amount of power generation by the membrane electrode assembly 410 of this non-narrowed downstream area and lowers the flow of electric current in this local area. Measurement of the local current flowing in this local area having the higher potential for the decrease in hydrogen concentration by the current sensor 340 of the local current detector 300 indirectly detects a decrease in hydrogen concentration and an increase in concentration of the impurity gas in the fuel cell stack 100.

D2. Impurity Gas Discharge Control

Figure 9:
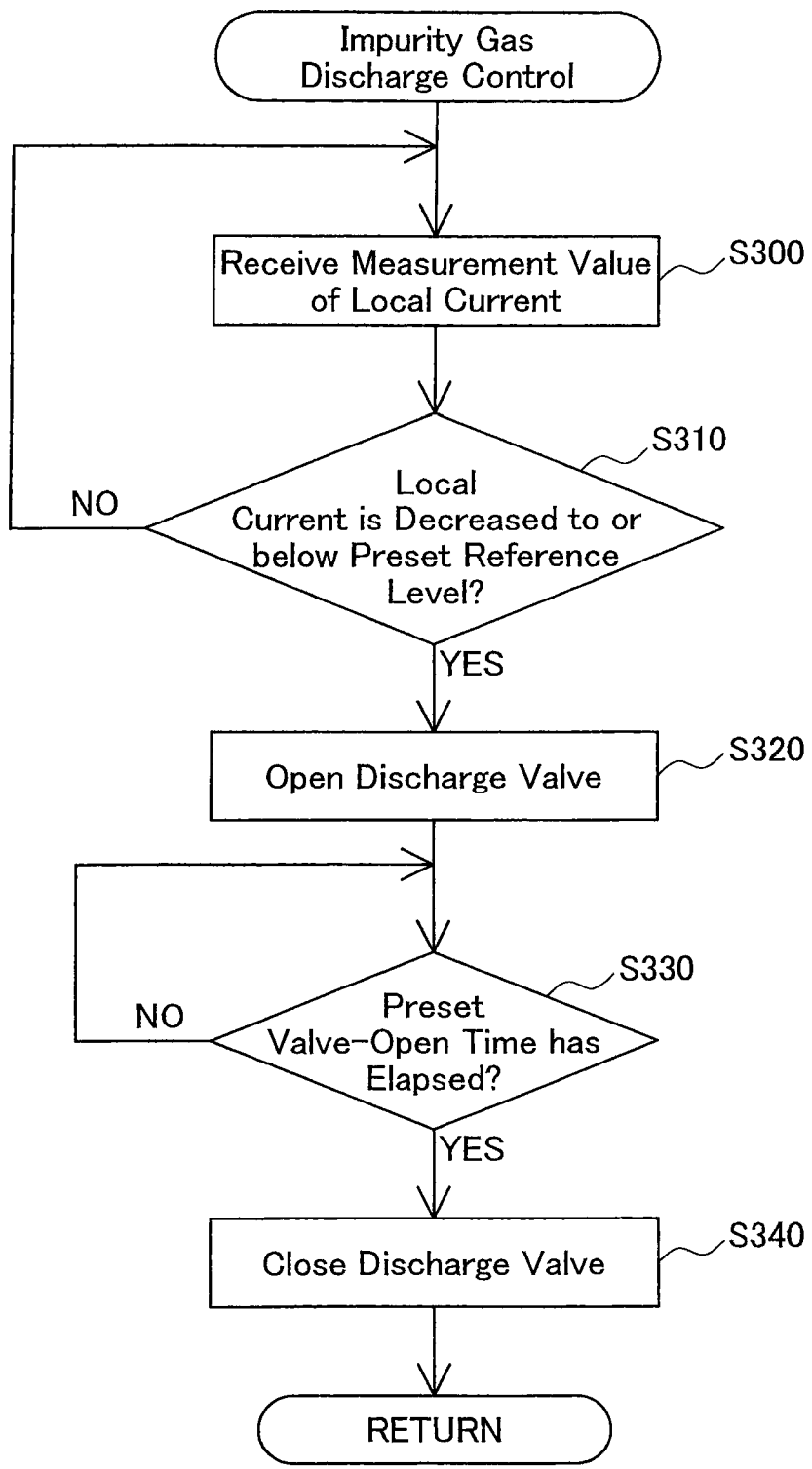
FIG. 9 is a flowchart showing a series of impurity gas discharge control executed in the third embodiment.

FIG. 9 is a flowchart showing a series of impurity gas discharge control executed in the third embodiment. The CPU of the control unit 80 occasionally executes the impurity gas discharge control in the course of power generation. The discharge valve 55 is closed on a start of the impurity gas discharge control.

The CPU receives a measurement value of the local current flowing through the local current measurement plate 310 from the current sensor 340 (step S300) and determines whether the measured local current is decreased to or below a preset reference level (step S310). The reference level of the local current is set, for example, to a lower limit of a non-carbon oxidation range where the catalyst layer of the cathode in the membrane electrode assembly 410 has no carbon oxidation by the decrease of the hydrogen concentration.

When the local current received at step S300 is decreased to or below the preset reference level (step S310: yes), the CPU estimates an increase in concentration of the impurity gas included in the anode off gas and a resulting excessive relative decrease in hydrogen concentration. The CPU accordingly opens the discharge valve 55 (step S320) to enable discharge of the impurity gas-containing anode off gas out of the fuel cell stack 100. When the local current is higher than the preset reference level (step S310: no), on the other hand, the processing of steps S300 and S310 is repeated.

The CPU then determines whether a preset valve-open time has elapsed since the opening of the discharge valve 55 (step S330). The valve-open time is set to a certain time period required for sufficiently discharging the impurity gas out of the fuel cell stack 100.

After elapse of the preset valve-open time (step S330: yes), the CPU closes the discharge valve 55 (step S340) to stop the discharge of the impurity gas-containing anode off gas out of the fuel cell stack 100.

The structure of the third embodiment also enables the effective use of hydrogen as the fuel gas and prevents deterioration of the membrane electrode assemblies 410 of the fuel cell stack 100 by carbon oxidation in the anode dead end-type fuel cell system 1000.

E. Fourth Embodiment

E1. Structure of Cell

FIG. 10 shows the structure of a cathode separator 42E, a seal gasket-integrated MEA 41E, and an anode separator 43E of a second cell 40E in a fourth embodiment of the invention. Like the first cell 40A described in the first embodiment, the second cell 40E of the fourth embodiment has a rectangular shape and includes the seal gasket-integrated MEA 41E interposed between the cathode separator 42E and the anode separator 43E.

FIG. 10(a) is a perspective view of the cathode separator 42E seen from the seal gasket-integrated MEA 41E. FIG. 10(b) is a perspective view of the seal gasket-integrated MEA 41E seen from the cathode separator 42E. FIG. 10(c) is a perspective view of the anode separator 43E seen from the seal gasket-integrated MEA 41E.

As illustrated, the seal gasket-integrated MEA 41E, the cathode separator 42E, and the anode separator 43E of the second cell 40E have through holes of the identical shapes at the identical positions with those formed in the seal gasket-integrated MEA 41A, the cathode separator 42A, and the anode separator 43A of the first cell 40A.

As clearly shown in FIG. 10(b), the seal gasket-integrated MEA 41E of the fourth embodiment has a completely different structure from those of the seal gasket-integrated MEAs 41B, 41C, and 41D of the first through the third embodiments. In the seal gasket-integrated MEA 41E of the fourth embodiment, a membrane electrode assembly 410E is provided in a narrow area between the through hole 41ai and the through hole 41ao. The seal gasket-integrated MEA 41E has a conductive member 420 made of, for example, a metal plate on its substantial center, where the membrane electrode assembly 410 or 410C is provided in the first to the third embodiments.

As shown in FIG. 10(c), the anode separator 43E has a groove 43Ed formed between the through hole 43ai and the through hole 43ao to make a flow of hydrogen along the surface of the anode of the membrane electrode assembly 410E. The groove 43Ed has a significantly shorter flow path length than the flow path length of the groove 43d formed in the first cell 40A (see FIG. 2). The gas flow path defined by the groove 43Ed in the second cell 40E has a practically equivalent pressure loss to the pressure loss of the gas flow path defined by the groove 43d in the first cell 40A.

As shown in FIG. 10(a), the cathode separator 42E has a groove 42Ed formed between the through hole 42ci and the through hole 42co to make a flow of the air along the surface of the cathode of the membrane electrode assembly 410E.

As shown in FIGS. 10(a) and 10(c), the cathode separator 42E and the anode separator 43E respectively have an insulating member 42i and an insulating member 43i to prevent electric current generated by the membrane electrode assembly 410E provided in the seal gasket-integrated MEA 41E from flowing into the conductive member 420 of the seal gasket-integrated MEA 41E or into the first cell 40A adjacent to the second cell 40E.

Figure 11:
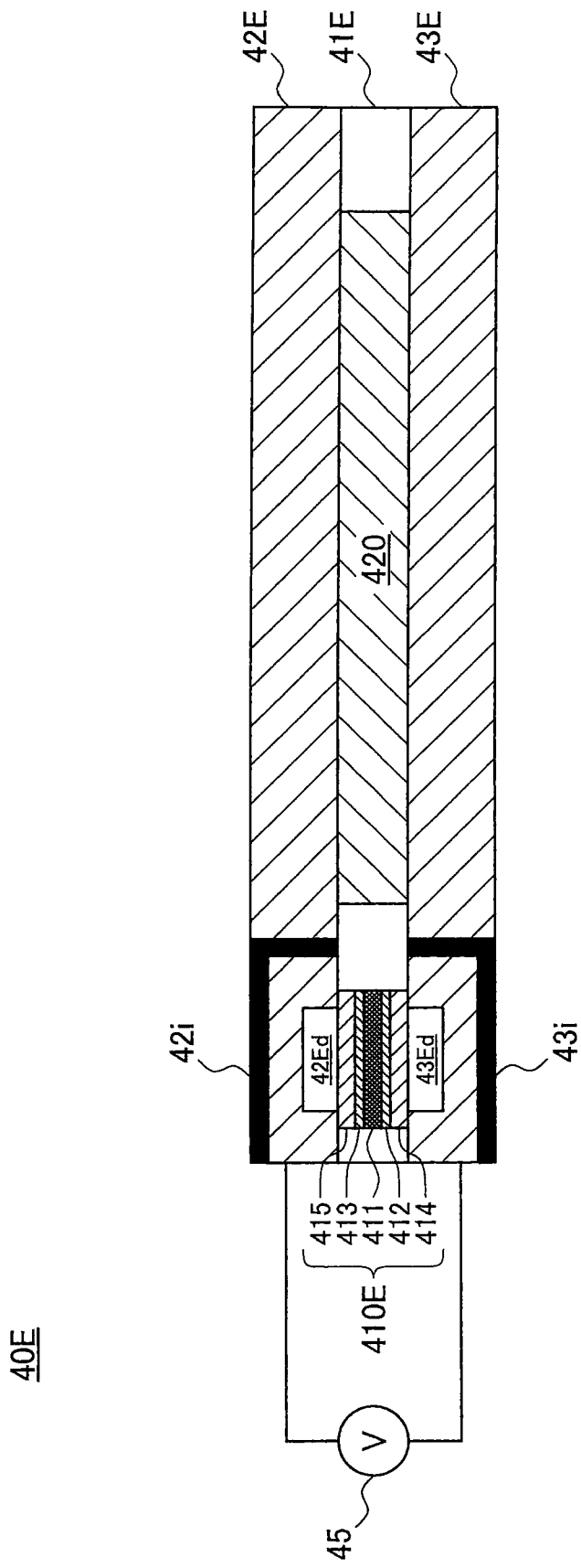
FIG. 11 is a sectional view showing the structure of the second cell in the fourth embodiment.

FIG. 11 is a sectional view of the second cell 40E, taken on the line B-B in FIG. 10(b).

As illustrated, the membrane electrode assembly 410E provided in the seal gasket-integrated MEA 41E has an anode catalyst layer 412 and an anode gas diffusion layer 414 formed in this sequence on an anode-side surface of an electrolyte membrane 411, and a cathode catalyst layer 413 and a cathode gas diffusion layer 415 formed in this sequence on a cathode-side surface of the electrolyte membrane 411. The membrane electrode assembly 410E generates electricity by the electrochemical reaction of hydrogen supplied through the groove 43Ed on the anode separator 43E and oxygen in the air supplied through the groove 42Ed on the cathode separator 42E. As mentioned previously, the cathode separator 42E and the anode separator 43E respectively have the insulating members 42i and 43i. The electric current generated in the membrane electrode assembly 410E is accordingly not flowed into the adjacent first cell 40A or into a load connecting with the fuel cell stack 100. A voltage sensor 45 is connected to the second cell 40E to measure an open circuit voltage of the second cell 40E as shown in FIG. 11.

In the course of power generation with the discharge valve 55 (see FIG. 1) in the closed state, the groove 43Ed on the anode separator 43E of the second cell 40E has a higher potential for a decrease in hydrogen concentration, compared with the grooves 43d formed on the anode separators 43A of the first cells 40A. The decreased hydrogen concentration lowers the power generation performance by the membrane electrode assembly 410E. Measurement of the open circuit voltage of the second cell 40E by the voltage sensor 45 detects a decrease in hydrogen concentration and an increase in concentration of the impurity gas in the fuel cell stack 100 with high accuracy.

E2. Impurity Gas Discharge Control

Figure 12:
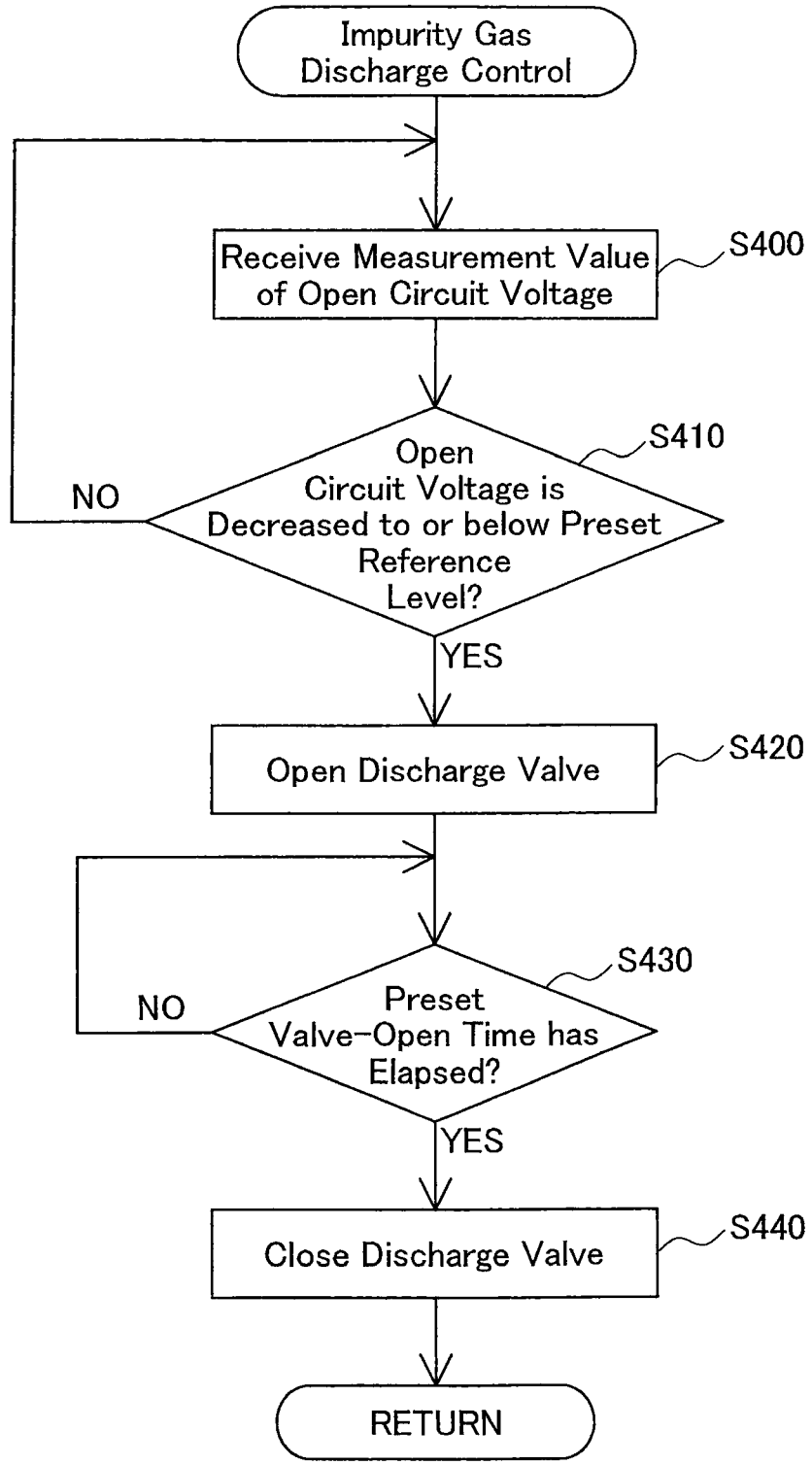
FIG. 12 is a flowchart showing a series of impurity gas discharge control executed in the fourth embodiment.

FIG. 12 is a flowchart showing a series of impurity gas discharge control executed in the fourth embodiment. The CPU of the control unit 80 occasionally executes the impurity gas discharge control in the course of power generation. The discharge valve 55 is closed on a start of the impurity gas discharge control.

The CPU receives a measurement value of the open circuit voltage of the second cell 40E from the voltage sensor 45 (step S400) and determines whether the measured open circuit voltage is decreased to or below a preset reference level (step S410). The reference level of the open circuit voltage is set, for example, to a lower limit of a non-carbon oxidation range where the catalyst layer of the cathode in the membrane electrode assembly 410E has no carbon oxidation by the decrease of the hydrogen concentration.

When open circuit voltage received at step S400 is decreased to or below the preset reference level (step S410: yes), the CPU estimates an increase in concentration of the impurity gas included in the anode off gas and a resulting excessive relative decrease in hydrogen concentration. The CPU accordingly opens the discharge valve 55 (step S420) to enable discharge of the impurity gas-containing anode off gas out of the fuel cell stack 100. When the open circuit voltage of the second cell 40E is higher than the preset reference level (step S410: no), on the other hand, the processing of steps S400 and S410 is repeated.

The CPU then determines whether a preset valve-open time has elapsed since the opening of the discharge valve 55 (step S430). The valve-open time is set to a certain time period required for sufficiently discharging the impurity gas out of the fuel cell stack 100.

After elapse of the preset valve-open time (step S430: yes), the CPU closes the discharge valve 55 (step S440) to stop the discharge of the impurity gas-containing anode off gas out of the fuel cell stack 100.

The structure of the fourth embodiment also enables the effective use of hydrogen as the fuel gas and prevents deterioration of the membrane electrode assemblies 410E of the fuel cell stack 100 by carbon oxidation in the anode dead end-type fuel cell system 1000.

F. Fifth Embodiment

In the first through the fourth embodiments described above, the base operation condition of the fuel cell system 1000 is the dead end operation in the fully closed state of the discharge valve 55. The base operation condition of a fuel cell system in a fifth embodiment of the invention is continuous low discharge operation in a slightly opened state of the discharge valve 55.

The continuous low discharge operation substantially retains the fuel gas inside the fuel cell stack 100 as in the dead end operation. In the fuel cell system of the fifth embodiment, the opening of the discharge valve 55 is regulated to allow continuous discharge of an extremely low flow rate of the anode off gas out of the fuel cell system, compared with the consumption amount of the fuel gas in the fuel cell stack 100. This continuous low discharge operation gradually discharges the impurity accumulated in an anode off gas exhaust manifold out of the fuel cell system and allows continuous shift of the impurity from an anode gas (fuel gas) flow path to the anode off gas exhaust manifold. This arrangement effectively keeps the impurity concentration in the anode gas flow path at a sufficiently low level.

G. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

G1. Modified Example 1

The impurity gas discharge control of the first embodiment closes the discharge valve 55 on elapse of the preset valve-open time since opening of the discharge valve 55 at step S130. A modified flow of the impurity gas discharge control may control the hydrogen concentration sensor 43s to continuously monitor the hydrogen concentration after opening of the discharge valve 55 and close the discharge valve 55 in response to recovery of the hydrogen concentration to or above a preset reference hydrogen concentration.

The impurity gas discharge control of the second embodiment closes the discharge valve 55 on elapse of the preset valve-open time since opening of the discharge valve 55 at step S230. A modified flow of the impurity gas discharge control may control the potential sensor 44 to continuously monitor the partial potential of the partial electrode 410p after opening of the discharge valve 55 and close the discharge valve 55 in response to recovery of the partial potential to or below a preset reference potential.

The impurity gas discharge control of the third embodiment closes the discharge valve 55 on elapse of the preset valve-open time since opening of the discharge valve 55 at step S330. A modified flow of the impurity gas discharge control may control the current sensor 340 to continuously monitor the local current flowing through the local current measurement plate 310 after opening of the discharge valve 55 and close the discharge valve 55 in response to recovery of the local current to or above a preset reference current value.

The impurity gas discharge control of the fourth embodiment closes the discharge valve 55 on elapse of the preset valve-open time since opening of the discharge valve 55 at step S430. A modified flow of the impurity gas discharge control may control the voltage sensor 45 to continuously monitor the open circuit voltage of the second cell 40E after opening of the discharge valve 55 and close the discharge valve 55 in response to recovery of the open circuit voltage to or above a preset reference voltage.

G2. Modified Example 2

In the structure of the first embodiment described above, the hydrogen concentration sensor 43s is provided on the second cell 40B. The impurity gas discharge control is performed based on the hydrogen concentration measured by the hydrogen concentration sensor 43s. The hydrogen concentration sensor 43s is, however, not essential. One possible modification may use a nitrogen concentration sensor for measuring the concentration of nitrogen as the impurity gas, in place of the hydrogen concentration sensor 43s. In this modified structure, the impurity gas discharge control is performed based on the nitrogen concentration measured by the nitrogen concentration sensor.

G3. Modified Example 3

In the structure of the second embodiment described above, the partial electrode 410p is provided on the cathode of the membrane electrode assembly 410C, and the potential sensor 44 measures the cathode potential of the partial electrode 410p. This arrangement is, however, not restrictive. In one modified structure, a partial electrode is provided on the anode of the membrane electrode assembly 410C at a specific position opposed to the position of the partial electrode 410p across the electrolyte membrane, and a potential sensor measures the anode potential of the partial electrode. This is because the decrease in hydrogen concentration on the anode increases the anode potential as well as the cathode potential.

G4. Modified Example 4

In the first through the third embodiments described above, the restriction element 43e is located in the downstream of the groove 43Bd, 43Cd, or 43Dd formed in the second cell 40B, 40C, or 40D. This arrangement of the restriction element 43e is, however, not restrictive. The restriction element 43e may be located at any arbitrary position in the groove 43Bd, 43Cd, or 43Dd.

G5. Modified Example 5

In the first through the third embodiments described above, the restriction element 43e is provided in part of the groove 43Bd, 43Cd, or 43Dd formed in the second cell 40B, 40C, or 40D. The groove 43Bd, 43Cd, or 43Dd may be formed to make the smaller sectional area of flow passage over the whole area of the groove 43Bd, 43Cd, or 43Bd than the sectional area of flow passage in the groove 43d formed on the first cell 40A.

G6. Modified Example 6

In the embodiments described above, the fuel cell stack 100 has only one second cell. The number of the second cell is, however, not restricted to one but may be plural. In the fuel cell stack 100 having multiple second cells, a preferable flow of the impurity gas discharge control determines the discharge timing of the anode off gas out of the fuel cell stack 100, based on the lowest concentration of the fuel gas in the second cell among the multiple second cells.

G7. Modified Example 7

In the embodiments described above, the hydrogen flow path and the air flow path in each cell are defined by the grooves formed in the anode separator and in the cathode separator. The flow paths of hydrogen and the air may alternatively be defined by electrically-conductive porous bodies, in place of formation of the grooves.

The invention claimed is:

1. A fuel cell having a stack structure of multiple cells, where each of the cells has a membrane electrode assembly that is obtained by integrating an anode with a cathode across a specific electrolyte membrane and is interposed between a pair of separators, the fuel cell comprising:
   a fuel gas supply manifold that distributes a supply of fuel gas to the anodes of the respective cells; and
   an anode off gas exhaust manifold that collects flows of unconsumed fuel gas-containing anode off gas from the anodes of the respective cells to a collective flow of the anode off gas and discharges the collective flow of the anode off gas out of the fuel cell,
   each of the cells having a fuel gas flow path that makes a flow of the fuel gas, which is supplied from the fuel gas supply manifold, along surface of the anode and makes a flow of the anode off gas into the anode off gas exhaust manifold,
   the multiple cells including:
   a first cell having a first fuel gas flow path; and
   a second cell having a second fuel gas flow path, which is constructed to have a specific flow path structure having a higher potential for a decrease in concentration of the fuel gas in at least a partial area during power generation, compared with a potential of the first fuel gas flow path, the specific flow path structure of the second fuel gas flow path including
   a restriction element that narrows a sectional area of flow passage in part of the second fuel gas flow path;
   a non-narrowed area other than the restriction element, the specific flow path structure being configured such that fuel gas in a specific part of the non-narrowed area downstream of the restriction element has a pressure lower than a pressure of fuel gas in the first fuel gas flow path, and
   a sensor that measures a specific parameter value relating to the decrease in concentration of the fuel gas in the second fuel gas flow path;
   wherein the cathode of the membrane electrode assembly of the second cell includes a partial electrode located in an area opposite to the specific part of the non-narrowed area downstream of the restriction element; and
   wherein the sensor is a potential sensor that measures a local cathode potential of the partial electrode in the area opposite to the non-narrowed downstream area across the specific electrolyte membrane of the second cell as the specific parameter value.

2. A fuel cell system, comprising:
   the fuel cell in accordance with claim 1;
   an exhaust conduit that is connected to the anode off gas exhaust manifold;
   a discharge valve that is located in the exhaust conduit; and
   a controller that controls a discharge amount of the discharge valve,
   wherein the controller enables power generation by the fuel cell with a supply of the fuel gas and a supply of an oxidizing gas respectively to the anode and to the cathode of each cell in a restricted state of the discharge valve, controls the sensor to measure the specific parameter value during power generation by the fuel cell, and opens the discharge valve in response to estimation of a decrease in concentration of the fuel gas in the second fuel gas flow path to or below a preset reference level, based on the measured specific parameter value.

3. A control method of a fuel cell system including a fuel cell, the fuel cell having a stack structure of multiple cells, where each of the cells has a membrane electrode assembly that is obtained by integrating an anode with a cathode across a specific electrolyte membrane and is interposed between a pair of separators, the fuel cell having a fuel gas supply manifold that distributes a supply of fuel gas to the anodes of the respective cells; and an anode off gas exhaust manifold that collects flows of unconsumed anode off gas from the anodes of the respective cells to a collective flow of the anode off gas and discharges the collective flow of the anode off gas out of the fuel cell,
   each of the cells having a fuel gas flow path that makes a flow of the fuel gas, which is supplied from the fuel gas supply manifold, along surface of the anode and makes the flow of the anode off gas into the anode off gas exhaust manifold,
   the multiple cells including: a first cell having a first fuel gas flow path; and a second cell having a second fuel gas flow path, which is constructed to have a specific flow path structure having a higher potential for a decrease in concentration of the fuel gas in at least a partial area during power generation, compared with a potential of the first fuel gas flow path, the specific flow path structure of the second fuel gas flow path including
   a restriction element that narrows a sectional area of flow passage in part of the second fuel gas flow path;
   a non-narrowed area other than the restriction element, the specific flow path structure being configured such that fuel gas in a specific part of the non-narrowed area downstream of the restriction element has a pressure lower than a pressure of fuel gas in the first fuel gas flow path, and
   a sensor that measures a specific parameter value relating to the decrease in concentration of the fuel gas in the second fuel gas flow path;
   wherein the cathode of the membrane electrode assembly of the second cell includes a partial electrode located in an area opposite to the specific part of the non-narrowed area downstream of the restriction element; and
   wherein the sensor is a potential sensor that measures a local cathode potential of the partial electrode in the area opposite to the non-narrowed downstream area across the specific electrolyte membrane of the second cell as the specific parameter value,
   the fuel cell system including:
   the fuel cell;
   an exhaust conduit that is connected to the anode off gas exhaust manifold; and
   a discharge valve that is located in the exhaust conduit,
   the control method comprising:
   (a) enabling power generation by the fuel cell with a supply of the fuel gas and a supply of an oxidizing gas respectively to the anode and to the cathode of each cell in a restricted state of the discharge valve;
   (b) controlling the sensor to measure the specific parameter value during power generation by the fuel cell;

(c) determining when a concentration of the fuel gas in the second fuel gas flow path is decreased to or below a preset reference level, based on the measured specific parameter value; and (d) opening the discharge valve upon determination in the step (c) that the concentration of the fuel gas in the second fuel gas flow path is decreased to or below the preset reference level.

* * * * *